United States Patent
Cho et al.

(10) Patent No.: US 11,734,661 B2
(45) Date of Patent: Aug. 22, 2023

(54) CONTENT DISTRIBUTION MANAGEMENT SYSTEM AND METHOD USING BLOCKCHAIN TECHNOLOGY

(71) Applicant: ALTICAST CORPORATION, Seoul (KR)

(72) Inventors: Chang Hoon Cho, Seoul (KR); Jung Ki Min, Seoul (KR)

(73) Assignee: ALTIMEDIA CORPORATION, Seoul (KR)

( * ) Notice: Subject to any disclaimer, the term of this patent is extended or adjusted under 35 U.S.C. 154(b) by 405 days.

(21) Appl. No.: 16/760,239

(22) PCT Filed: Oct. 31, 2018

(86) PCT No.: PCT/KR2018/013090
§ 371 (c)(1),
(2) Date: Apr. 29, 2020

(87) PCT Pub. No.: WO2019/088687
PCT Pub. Date: May 9, 2019

(65) Prior Publication Data
US 2020/0356969 A1  Nov. 12, 2020

(30) Foreign Application Priority Data
Nov. 1, 2017  (KR) ........................ 10-2017-0144776

(51) Int. Cl.
*G06Q 20/12* (2012.01)
*G06Q 20/40* (2012.01)
*H04L 9/00* (2022.01)

(52) U.S. Cl.
CPC ......... *G06Q 20/123* (2013.01); *G06Q 20/401* (2013.01); *G06Q 2220/00* (2013.01); *H04L 9/50* (2022.05)

(58) Field of Classification Search
CPC .. G06Q 20/123; G06Q 20/401; H04L 9/3236; H04L 9/50
(Continued)

(56) References Cited

U.S. PATENT DOCUMENTS

2017/0337534 A1* 11/2017 Goeringer ............ G06Q 50/184
2018/0041571 A1*  2/2018 Rogers ................ G06F 16/2379
(Continued)

FOREIGN PATENT DOCUMENTS

KR    10-2009-0064142 A      6/2009
KR       20090064142 A  *   6/2009   ......... H04N 21/2543
(Continued)

OTHER PUBLICATIONS

A Study on Copyright Protection Method of Digital Contents using Block Chain. LEE, Sang Min (Aug. 31, 2017).

*Primary Examiner* — Neha Patel
*Assistant Examiner* — Courtney P Jones

(57) ABSTRACT

The present invention relates to a content distribution management technology using blockchain technology. The content distribution management system using blockchain technology, according to one embodiment, may comprise: a purchase transaction generation unit for generating a purchase transaction in response to a content purchase request signal from a user terminal; a broadcasting processing unit for broadcasting the generated purchase transaction; a transaction processing unit for collecting a use transaction if, after the broadcast purchase transaction is verified, the content corresponding to the verified purchase transaction is used on the user terminal; a transaction verification unit for verifying the collected use transaction; a block generation unit for generating a first block and a second block corresponding to the verified use transaction; and a distributed
(Continued)

ledger management unit for separately recording the generated first and second blocks in respective distributed ledgers.

15 Claims, 5 Drawing Sheets

(58) Field of Classification Search
USPC .......................................................... 705/75
See application file for complete search history.

(56) References Cited

U.S. PATENT DOCUMENTS

| | | | |
|---|---|---|---|
| 2018/0285996 A1* | 10/2018 | Ma | H04L 9/3297 |
| 2019/0118094 A1* | 4/2019 | McCoy | A63F 13/85 |
| 2019/0179801 A1* | 6/2019 | Jang | G06F 16/137 |
| 2020/0160466 A1* | 5/2020 | Hori | G06Q 50/184 |
| 2020/0244472 A1* | 7/2020 | Dinkelaker | G06Q 20/102 |

FOREIGN PATENT DOCUMENTS

| | | | |
|---|---|---|---|
| KR | 10-1103611 B | 1/2012 | |
| KR | 10-1103611 B1 * | 1/2012 | H04L 67/025 |
| KR | 10-2016-0150278 A | 12/2016 | |
| KR | 10-1701131 B1 | 2/2017 | |
| KR | 10-2017-0085021 A | 7/2017 | |
| KR | 10-1781583 B1 | 9/2017 | |

\* cited by examiner

[FIG. 1]
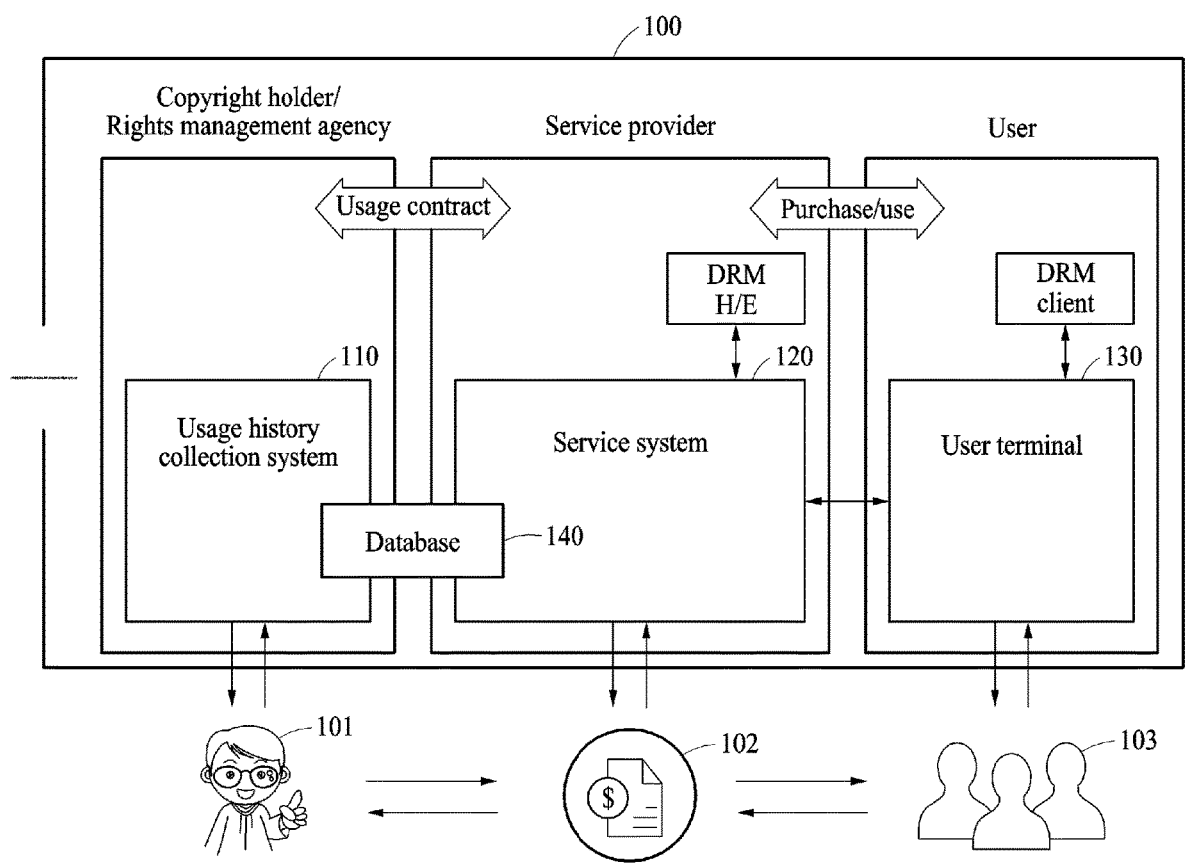

[FIG. 2]
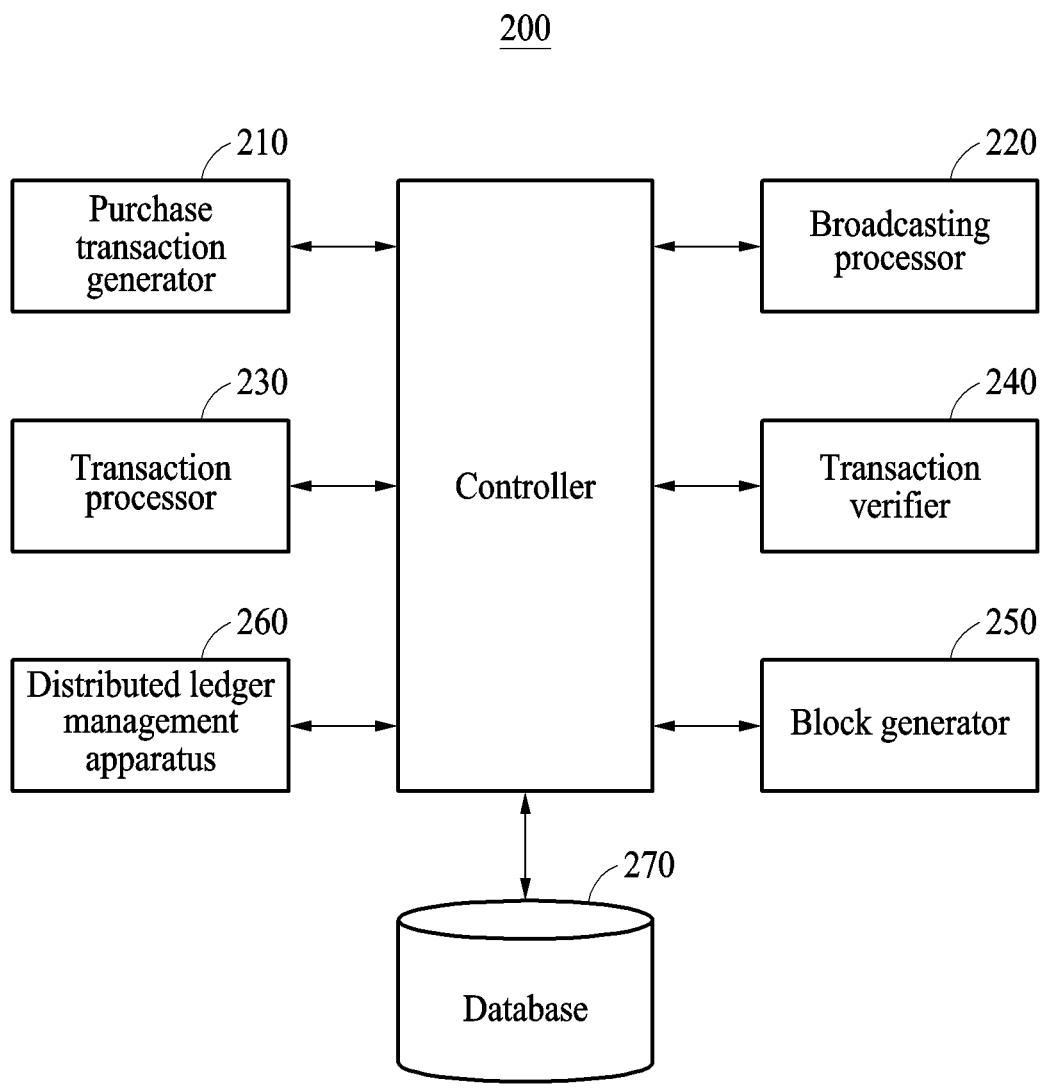

[FIG. 3]
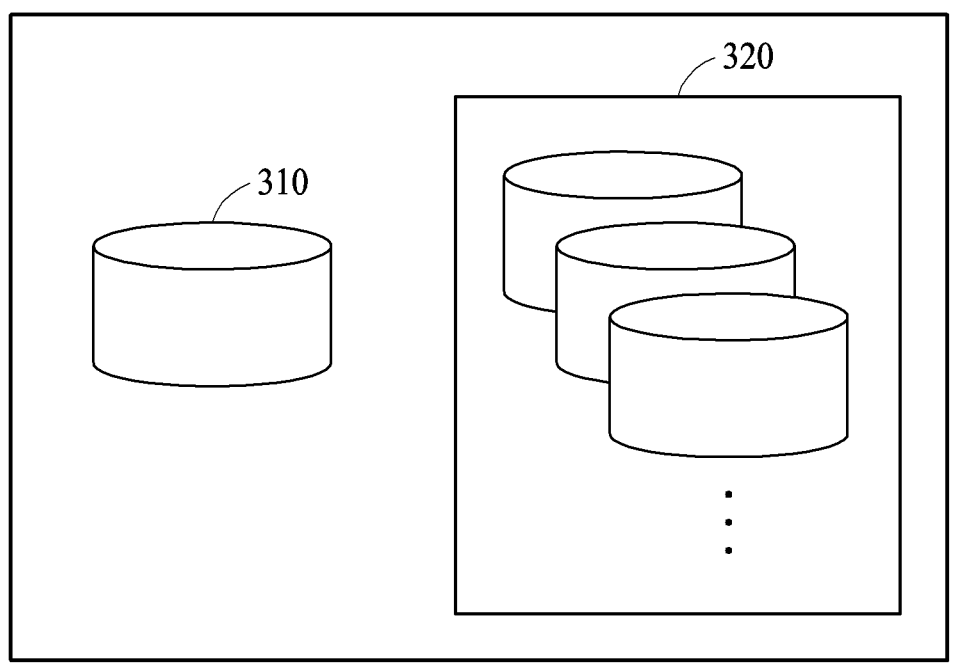

[FIG. 4]
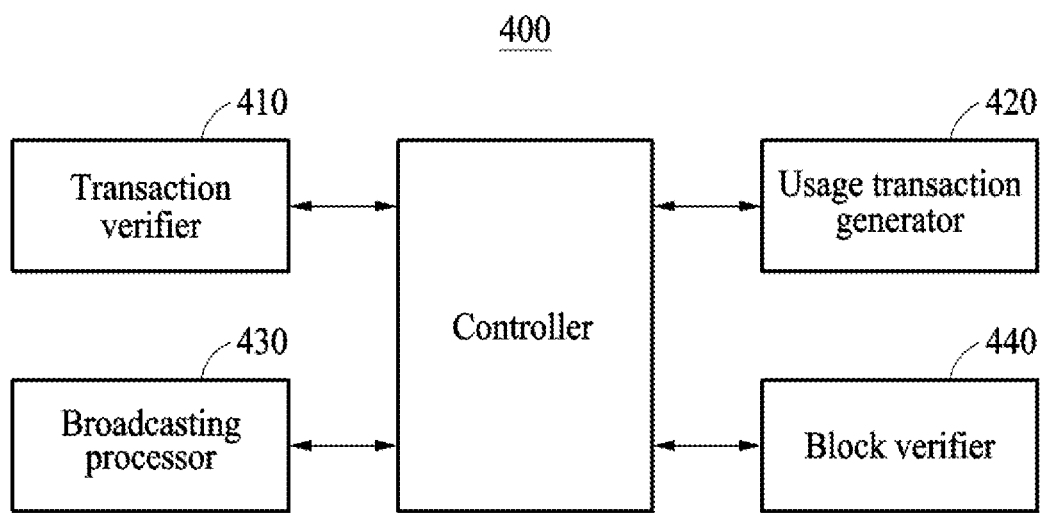

【FIG. 5】
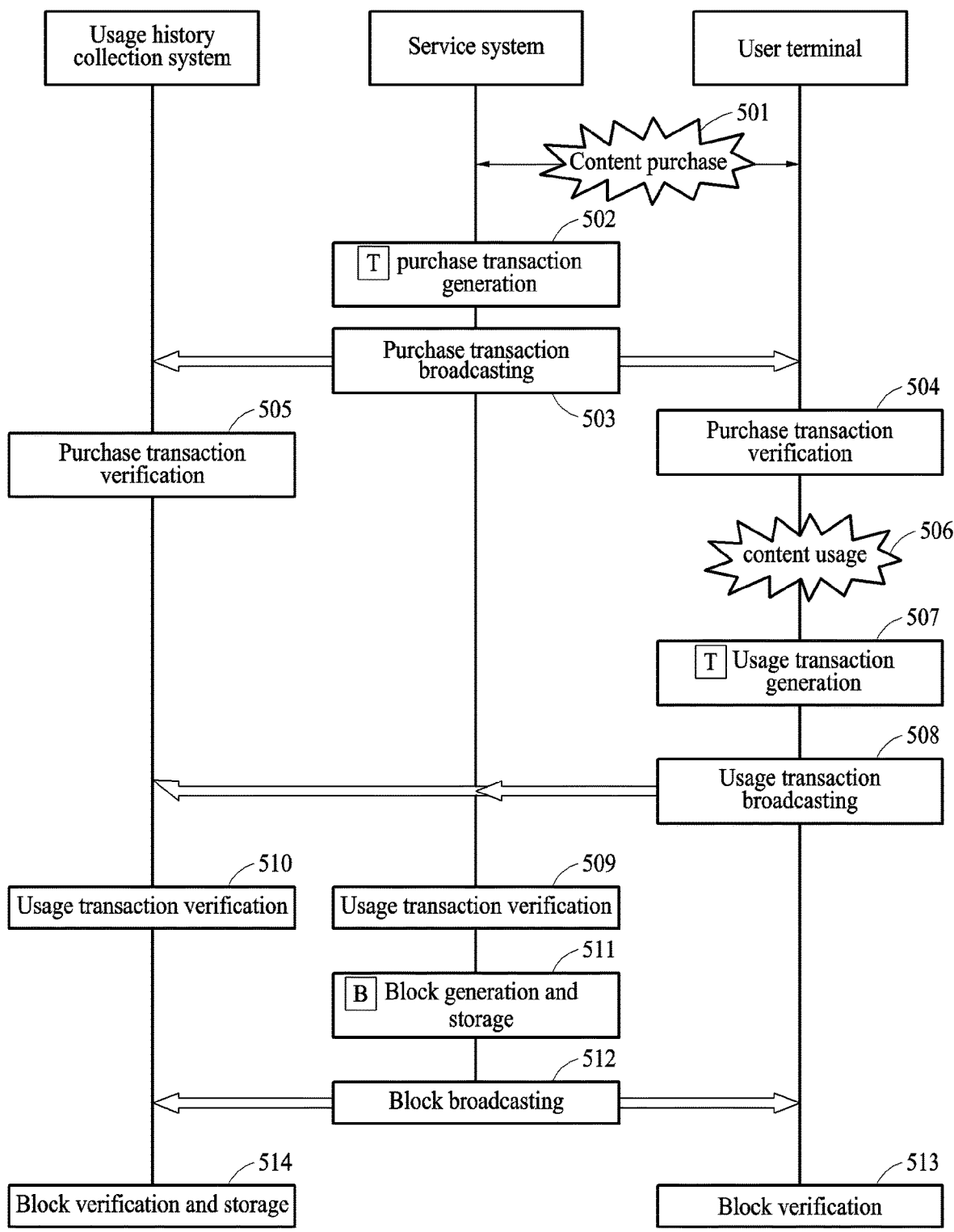

CONTENT DISTRIBUTION MANAGEMENT SYSTEM AND METHOD USING BLOCKCHAIN TECHNOLOGY

CROSS-REFERENCE TO RELATED APPLICATIONS

This application is a National Stage Entry of PCT International Application No. PCT/KR2018/013090, which was filed on Oct. 31, 2018, and which claims priority from and the benefit of Korean Patent Application 10-2017-0144776, filed with the Korean Intellectual Property Office on Nov. 1, 2017, the disclosure of which is hereby incorporated by reference in its entirety.

BACKGROUND OF THE DISCLOSURE

Field of the Disclosure

The present disclosure relates to a content distribution management technology using blockchain technology. More specifically, the present disclosure relates to a technical idea for generating transactions according to purchase and use of content and generating blocks based on the generated transactions and storing the generated blocks in the form of a distributed ledger, thereby ensuring integrity of content distribution and flows related to the same.

Description of the Related Art

Globally, the market size and growth rate of technology related to a digital content distribution platform has been steadily increasing, and it is expected that the technology will continue to grow over the next several years.

In particular, as the mobile network develops, the size of the Over the Top (OTT) market is rapidly growing. In this regard, markets for premium content consumption and premium content platforms are expected to steadily grow.

In accordance with this market prospect, interest in the market size of Internet of Things (IoT) and devices related to IoT is also rising due to the IoT environment. In particular, media content is classified as the most exchanged and consumed information in combination with the IoT environment, and is expected to be distributed and consumed through various media.

A market related to technologies that combine various types of media content and the IoT environment is expected to rapidly grow. In addition, as use of the IoT environment increases, improvement in technologies related to content distribution management systems and billing systems is required.

In addition, as improvement in content distribution and billing suitable for the IoT environment is required, there is an urgent need for a strategy to preoccupy the future market by developing a novel content distribution management platform and a novel billing platform.

SUMMARY OF THE DISCLOSURE

Therefore, the present disclosure has been made in view of the above problems, and it is an object of the present disclosure to provide a model for novel content distribution management.

It is another object of the present disclosure to ensure the integrity of content distribution management by applying blockchain technology to content distribution management.

It is another object of the present disclosure to block and prevent illegal distribution of content by applying blockchain technology to content distribution management.

It is another object of the present disclosure to design a model for a novel content distribution management platform to which blockchain technology is applied.

It is another object of the present disclosure to secure technical competitiveness for a novel content distribution management platform.

It is another object of the present disclosure to increase reliability using blockchain technology capable of implementing the integrity of content distribution management.

It is another object of the present disclosure to finely check the current status of usage related to content distribution by applying blockchain technology to content distribution management.

It is another object of the present disclosure to efficiently manage a distributed ledger in content distribution management based on blockchain technology.

It is another object of the present disclosure to provide blockchain technology for distributing a ledger in which transaction information is recorded to a P2P network rather than a central server so that participants may jointly manage the records. Therefore, in the conventional method, a trusted third party (TTP) for trusting the database of a central server is required, but the present disclosure may omit such a requirement.

It is yet another object of the present disclosure to improve security, transparency, safety, and efficiency compared to conventional centralized systems by using blockchain technology.

In accordance with the present disclosure, the above and other objects can be accomplished by the provision of a content distribution management system using blockchain technology, including a purchase transaction generator for generating a purchase transaction in response to a content purchase request signal from a user terminal; a broadcasting processor for broadcasting the generated purchase transaction; a transaction processor, in which, when content corresponding to the verified purchase transaction is used in the user terminal after the broadcasted purchase transaction is verified, usage transactions generated in response to the current status of usage of the content are collected; a transaction verifier for verifying the collected usage transactions; a block generator, in which blocks corresponding to the verified usage transactions are generated, and in this case, a first block is generated through a first data group among the usage transactions and a first hash corresponding to the first data group, and a second block is generated through a second data group including the first data group and a second hash corresponding to the second data group; and a distributed ledger management apparatus for separately recording the generated first and second blocks in respective distributed ledgers.

According to one embodiment, the generated usage transactions may include data groups included in the verified purchase transaction.

According to one embodiment, the block generator may generate the first block by classifying data having a degree of importance higher than a reference value into the first data group, and may generate the second block by classifying entire data including the classified data into the second data group.

According to one embodiment, the block generator may generate the first block by classifying data classified according to the purpose of use into the first data group, and may generate the second block by classifying entire data including the classified data into the second data group.

According to one embodiment, the distributed ledger management apparatus may separately record the generated first and second blocks in a distributed ledger database capable of being shared by a service system and a usage history collection.

According to one embodiment, the distributed ledger management apparatus may record the generated first block in a first database in the form of a distributed ledger, and may record the generated second block in a second database in the form of another distributed ledger, wherein the first and second databases are physically separated from each other.

According to one embodiment, the distributed ledger management apparatus may delete the distributed ledger generated by the second block when predetermined conditions are satisfied.

According to one embodiment, when a set period has elapsed, the distributed ledger management apparatus may judge that the predetermined conditions are satisfied, and may delete the distributed ledger generated by the second block.

In accordance with another aspect of the present disclosure, there is provided a content distribution management system using blockchain technology, including a transaction verifier for receiving a purchase transaction generated in a service system when content is purchased and for verifying the received purchase transaction; a usage transaction generator for generating usage transactions by reflecting the current status of usage of the content corresponding to the verified purchase transaction; and a broadcasting processor for broadcasting the generated usage transactions, wherein the service system collects the broadcasted usage transactions; verifies the collected usage transactions; and generates and stores blocks corresponding to the verified usage transactions, and in this case, the service system generates a first block through a first data group among the usage transactions and a first hash corresponding to the first data group; and generates a second block through a second data group including the first data group and a second hash corresponding to the second data group; and separately records the generated first and second blocks in respective distributed ledgers.

According to one embodiment, the service system may further include a block verifier for broadcasting the generated first and second blocks and for collecting and verifying the broadcasted first and second blocks.

In accordance with yet another aspect of the present disclosure, there is provided a content distribution management method using blockchain technology, including a step of generating a purchase transaction in response to a content purchase request signal from a user terminal; a step of broadcasting the generated purchase transaction; a step of collecting usage transactions generated in response to the current status of usage of the content when content corresponding to the verified purchase transaction is used in the user terminal after the broadcasted purchase transaction is verified; a step of verifying the collected usage transactions; a step of generating a first block through a first data group among the usage transactions and a first hash corresponding to the first data group when blocks corresponding to the verified usage transactions are generated; a step of generating a second block through a second data group including the first data group and a second hash corresponding to the second data group; and a step of separately recording and managing the generated first and second blocks in respective distributed ledgers.

According to one embodiment, the step of generating a first block may include a step of generating the first block by classifying data having a degree of importance higher than a reference value into the first data group, and the step of generating a second block may include a step of generating the second block by classifying entire data including the classified data into the second data group.

According to one embodiment, the step of generating a first block may include a step of generating the first block by classifying data classified according to the purpose of use into the first data group, and the step of generating a second block may include a step of generating the second block by classifying entire data including the classified data into the second data group.

According to one embodiment, the step of separately recording and managing may include a step of separately recording the generated first and second blocks in a distributed ledger database capable of being shared by a service system and a usage history collection system.

According to one embodiment, the step of separately recording and managing may include a step of determining whether predetermined conditions are satisfied, and a step of deleting the distributed ledger generated by the second block when the predetermined conditions are satisfied.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a drawing for explaining a content distribution management system based on blockchain technology according to one embodiment;

FIG. 2 is a drawing for explaining a service system according to one embodiment;

FIG. 3 is a drawing for explaining the structure of a database according to one embodiment;

FIG. 4 is a drawing for explaining a user terminal according to one embodiment; and FIG. 5 is a drawing for explaining a content distribution management method based on blockchain technology according to one embodiment.

DETAILED DESCRIPTION OF THE DISCLOSURE

Specific structural and functional descriptions of embodiments according to the concept of the present disclosure disclosed herein are merely illustrative for the purpose of explaining the embodiments according to the concept of the present disclosure. Furthermore, the embodiments according to the concept of the present disclosure can be implemented in various forms and the present disclosure is not limited to the embodiments described herein.

The embodiments according to the concept of the present disclosure may be implemented in various forms as various modifications may be made. The embodiments will be described in detail herein with reference to the drawings. However, it should be understood that the present disclosure is not limited to the embodiments according to the concept of the present disclosure, but includes changes, equivalents, or alternatives falling within the spirit and scope of the present disclosure.

The terms such as "first" and "second" are used herein merely to describe a variety of constituent elements, but the constituent elements are not limited by the terms. The terms are used only for the purpose of distinguishing one constituent element from another constituent element. For example, a first element may be termed a second element and a second element may be termed a first element without departing from the teachings of the present disclosure.

It should be understood that when an element is referred to as being "connected to" or "coupled to" another element, the element may be directly connected or coupled to the other element or intervening elements may be present. In contrast, when an element is referred to as being "directly connected to" or "directly coupled to" another element, there are no intervening elements present. Other words used to describe the relationship between elements or layers should be interpreted in a like fashion (e.g., "between," versus "directly between," "adjacent," versus "directly adjacent," etc.).

The terms used in the present specification are used to explain a specific exemplary embodiment and not to limit the present inventive concept. Thus, the expression of singularity in the present specification includes the expression of plurality unless clearly specified otherwise in context. Also, terms such as "include" or "comprise" should be construed as denoting that a certain characteristic, number, step, operation, constituent element, component or a combination thereof exists and not as excluding the existence of or a possibility of an addition of one or more other characteristics, numbers, steps, operations, constituent elements, components or combinations thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred embodiments of the present disclosure will be described in detail with reference to the accompanying drawings. However, the scope of the present disclosure is not limited by these embodiments. Like reference numerals in the drawings denote like elements.

FIG. 1 is a drawing for explaining a content distribution management system 100 based on blockchain technology according to one embodiment.

A service system 120 according to one embodiment may provide content purchased by a user to a user terminal 130. In addition, the service system 120 according to one embodiment may generate a purchase transaction based on purchase of content, and the user terminal 130 may generate a usage transaction for the content in response to the generated purchase transaction.

The purchase transaction used in the present specification may include information such as transaction IDs, purchasers, purchase time, content identifiers, and service provider identifiers so that a history of purchase of content may be grasped.

In addition, the usage transaction may include information such as transaction IDs, users, usage time, content identifiers, and service provider identifiers so that a history of usage of content may be grasped.

After a certain period of time has elapsed, the service system 120 may analyze the current status of usage of all content used by a user 103 through the content usage transaction, and may use the analysis results in billing processing 102.

The purchase transaction and usage transaction generated in this manner may be generated as a block for blockchain technology and then stored and shared for verification. In this case, the generated blocks may be stored and maintained in the form of a distributed ledger.

For example, the generated block may be stored as a distributed ledger in the form of a blockchain through a hash corresponding to a current block and a hash corresponding to a previous block. Based on blockchain technology, the generated blocks or distributed ledgers may be shared by all entities involved in content distribution. Therefore, it is fundamentally impossible to modify only a part of the transaction included in one block or blocks.

Specifically, content such as pictures, music, movies, and broadcasts generated by a content creator 101 may be pre-registered for copyright thereof for use in a usage history collection system 110.

The copyright may be transmitted to the user terminal for granting a usage right to the content after being encrypted by a digital rights management (DRM) server. For example, the user 103 may be a purchaser who purchased the content.

The digital rights management (DRM) server may encrypt the copyright of the content purchased by the user 103 and provide the encrypted copyright to the user terminal.

The user terminal 130 may decode the copyright of the content and use the content through the decoded copyright. The content may be transmitted to the user terminal 130 by the service system 120, and then may be displayed on the user terminal 130.

According to one embodiment, the user terminal 130 may include a mobile phone, a computer, a notebook, a display device, a speaker, a tablet PC, and the like owned by the user 103.

When the user terminal 130 outputs the content, it may be considered that the content is used.

A usage transaction may be generated when use of the content ends.

That is, when use of the content is normally terminated, the user terminal 130 may generate a usage transaction corresponding to the content and transmit the usage transaction to the service system 120. For example, the user terminal 130 may broadcast the generated usage transaction to a network, and the service system 120 connected to the network and the usage history collection system 110 may collect the broadcasted usage transaction. In addition, the service system 120 and the usage history collection system 110 may verify the collected usage transaction based on blockchain technology to determine whether the collected usage transaction is valid.

Once the usage transaction is verified, the service system 120 may generate a block by reflecting to the usage transaction, and may store the block in the form of a distributed ledger.

That is, the present disclosure provides blockchain technology for distributing a ledger in which transaction information is recorded to a P2P network rather than a central server so that participants may jointly manage the records. Therefore, the present disclosure may ensure integrity compared to conventional distribution-related or encryption-related technology. That is, the present disclosure may provide improved security, transparency, safety, and efficiency using blockchain technology.

In addition, the generated block may be transmitted to another entity for verification. Specifically, the service system 120 may broadcast the block generated by reflecting the usage transaction in the usage history collection system 110 and the user terminal 130. The usage history collection system 110 for collecting the block and the user terminal 130 may verify the block based on blockchain technology.

In this case, at least one of the usage history collection system 110 and the user terminal 130 may store the verified block. For example, in the case of the usage history collection system 110, the block may be cumulatively recorded in a database in the form of a distributed ledger, and may be held for a period time for verification.

In addition, in the case of the user terminal 130, only block verification may be performed in consideration of the storage space, and the verified block may be discarded. However, after block verification, the block may be recorded in a relatively small capacity storage medium such as a memory, a hard disk, and a cloud server only for a short period of time.

The service system 120 according to one embodiment may analyze the current status of usage of the content through the usage transaction received from the user terminal 130.

The current status of usage may include the total usage time, the usage time zone, the usage amount, the number of usage times, and the terminal used for use of the content.

For example, when content is a two-hour movie and a usage transaction is received, the service system 120 may analyze total usage time and determine that the user of the user terminal 130 has used the content for two hours based on the analysis result.

In addition, the usage time zone may be interpreted as a specific time zone during the 24-hours. For example, the service system 120 may discount a billing amount by assigning a negative weight to the billing amount given according to the current status of usage, except for the prime time period in which content is frequently viewed. On the other hand, the service system 120 may add an extra amount to a billing amount by assigning a positive weight to the billing amount given according to the current status of usage during a prime time period in which content is frequently viewed.

The usage amount may be differently analyzed depending on the quality of content. For example, when a means for outputting content is a portable terminal, problems do not arise even when the quality of the content is low. In addition, when a means for outputting content is a 60-inch Ultra-HD (UHD) TV, content having a higher quality than that of the portable terminal should be used.

Therefore, the service system 120 according to one embodiment may differently analyze the usage amount considering the quality of the content even when the content is of the same type.

The number of usage times may be analyzed using the number of times content has been played back. The service system 120 according to one embodiment may count the number of usage times in consideration of the frequency with which content is provided to a user terminal.

In addition, the analysis of the terminal used may depend on the type of the terminal that displays content.

The service system 120 according to one embodiment may use the cumulative usage status of content used by a user for billing.

In addition, the content distribution management system 100 may further include a database 140 in which the generated distributed ledger is recorded.

Both the usage history collection system 110 and the service system 120 may access the database 140 according to one embodiment, and the distributed ledger generated from the block may be recorded in the database 140. In addition, the recorded distributed ledger may be stored and managed for a predetermined period of time.

For example, the service system 120 may generate blocks corresponding to usage transactions collected from the user terminal 130.

In this case, the service system 120 may generate an entire distributed ledger as a block reflecting the entire data included in the usage transaction, and may separately generate a partial distributed ledger as a block reflecting the partial data.

More specifically, the service system 120 may generate a first block through a first data group among usage transactions and a first hash corresponding to the first data group. In addition, the service system 120 may generate a second block through a second data group including the first data group and a second hash corresponding to the second data group.

In addition, the first block may be chained to the distributed ledger through the previous hash and the current hash (first hash), and the second block may also be chained to the distributed ledger through the previous hash and the current hash (second hash). However, the service system 120 may independently store and manage the distributed ledgers by the first and second blocks.

For example, a usage transaction may include data groups included in a purchase transaction.

The service system 120 according to one embodiment may generate a first block by classifying data having a degree of importance higher than a reference value into the first data group. In addition, the service system 120 may generate a second block by classifying entire data including the classified data into the second data group.

For example, data groups included in transactions may include not only the data that is essential, that is, the data to be maintained for a long time, but also the data that is required only in some entities for intermediate procedures. A degree of importance needed to distinguish between data may be predefined according to specifications for each data. In addition, the classified data may be set up at the request of a service system or a usage history collection system.

When blocks and distributed ledgers are generated using all data included in transactions, the storage space may be wasted, resulting in increase in costs.

Therefore, the service system 120 according to one embodiment may generate a separate first block using essential data having a degree of importance higher than a predetermined reference value among data groups included in transactions. The generated first block may be recorded and managed as a distributed ledger using a first hash and a previous hash.

In addition, the service system 120 according to one embodiment may generate a separate second block using all data without considering a degree of importance predetermined among data groups included in transactions. The generated second block may be recorded and managed as another distributed ledger using a second hash and a previous hash.

The service system 120 according to one embodiment may delete the distributed ledger generated by the second block when predetermined conditions are satisfied. For example, when a set period (for example, 1 month, 6 months, etc.) has elapsed, the service system 120 may determine that predetermined conditions are satisfied, and may delete the distributed ledger generated by the second block.

That is, the service system 120 according to one embodiment may generate blocks corresponding to only data classified as essential data among data groups included in usage transactions, and may record the blocks in the form of a distributed ledger.

In addition, among data groups constituting transactions, there may be data for a specific entity. For example, data mainly used in a service system and data mainly used in a usage history collection system may be different.

More specifically, in the service system, user IDs among data included in transactions are indispensable reference information. However, in the usage history collection system, user IDs need not necessarily be referenced. That is, in the usage history collection system, only the current status of usage of content that is held is considered, and user need not be considered.

Therefore, essential data may be different in each entity, and the service system may generate and manage three or more blocks instead of only first and second blocks in consideration of the above matters.

For example, a case wherein a first block includes essential data in the usage history collection system, a second block includes essential data in the service system, and a third block includes entire data may be considered.

After a predetermined time has elapsed, the service system may delete a distributed ledger generated by a third block, and may save only distributed ledgers generated by first and second blocks for a long time.

According to the present disclosure, a model for a novel content distribution management platform to which blockchain technology is applied may be designed, thereby securing technical competitiveness. In addition, reliability may be improved using blockchain technology capable of implementing the integrity of content distribution management.

FIG. 2 is a drawing for explaining a service system 200 according to one embodiment. The service system 200 according to one embodiment may generate transactions according to purchase and use of content, generate blocks based on the generated transactions, and store the blocks in the form of a distributed ledger, thereby ensuring the integrity of content distribution and flows related thereto.

The service system 200 may include a purchase transaction generator 210, a broadcasting processor 220, a transaction processor 230, a transaction verifier 240, and a block generator 250.

The purchase transaction generator 210 according to one embodiment may generate a purchase transaction in response to a content purchase request signal from a user terminal.

The user may generate an intention to purchase content. For example, the user may request purchase of specific content through the portable terminal of the user. In addition, the user may request purchase of content for controlling the user terminal.

When the purchase request is generated by the user, the purchase transaction generator 210 may check the content purchase request signal transmitted from the user terminal and generate a purchase transaction for the content in response to the request.

The purchase transaction may include identification information on the content, identification information on the user, purchase time, content information, usage rights, and the like.

The broadcasting processor 220 according to one embodiment may broadcast the generated purchase transaction.

The user terminal may collect and verify the broadcasted purchase transaction. In addition, a usage history collection system may collect and verify the broadcasted purchase transaction.

After verification of the broadcasted purchase transaction, when content corresponding to the verified purchase transaction is used in the user terminal, the transaction processor 230 according to one embodiment may collect a usage transaction generated in response to the current status of usage of the content.

For example, when use of the content is normally terminated, the user terminal may generate a usage transaction and broadcast the same. In this case, the transaction processor 230 according to one embodiment may collect the broadcasted usage transaction.

The transaction verifier 240 according to one embodiment may verify the collected usage transaction. Verification of the usage transaction may be performed based on blockchain technology. For example, the transaction verifier 240 may perform verification by comparing a usage transaction collected by the usage history collection system and a usage transaction collected by the transaction processor 230.

The block generator 250 according to one embodiment may generate a block corresponding to the verified usage transaction.

For this purpose, when use of the content is normally terminated, the user terminal according to one embodiment may generate and broadcast a usage transaction.

The transaction processor 230 may determine that the content is normally terminated when the usage transaction is received, and may analyze the current status of usage using the usage transaction.

Accordingly, the transaction processor 230 may calculate billing information based on the analyzed current status of usage.

In addition, the transaction processor 230 may calculate recommended content information corresponding to a user based on the analyzed current status of usage.

The service system may collect the broadcasted usage transactions, and may verify the collected usage transactions. In addition, the service system may generate and store blocks corresponding to the verified usage transactions. In this case, the service system may generate a first block through a first data group among the usage transactions and a first hash corresponding to the first data group.

In addition, the service system may generate a second block through a second data group including the first data group and a second hash corresponding to the second data group, and may separately record the generated first and second blocks in respective distributed ledgers.

The service system may broadcast the generated first and second blocks, and the transaction verifier 240 may collect and verify the broadcasted first and second blocks.

The block generator 250 according to one embodiment may generate blocks corresponding to the verified usage transactions. In this case, the block generator 250 may generate a first block through a first data group among the usage transactions and a first has corresponding to the first data group.

In addition, the block generator 250 may generate a second block through a second data group including the first data group and a second hash corresponding to the second data group.

In addition, a distributed ledger management apparatus 260 according to one embodiment may separately record the generated first and second blocks in respective distributed ledgers.

The block generator 250 according to one embodiment may generate a first block by classifying data having a degree of importance higher than a reference value into the first data group, and may generate a second block by classifying entire data including the classified data into the second data group.

For example, the block generator 250 may generate a first block by classifying data classified according to the purpose of use into the first data group, and may generate a second block by classifying entire data including the classified data into the second data group.

In addition, the distributed ledger management apparatus 260 may separately record the generated first and second blocks in a database 270 capable of being shared by a service system and a usage history collection system.

The database 270 may further include a plurality of databases capable of recording partial ledgers, which will be described in detail with reference to FIG. 3.

The distributed ledger management apparatus 260 according to one embodiment may delete the distributed ledger generated by the second block when predetermined conditions are satisfied. In addition, when a set period has elapsed, the distributed ledger management apparatus 260 may judge that predetermined conditions are satisfied, and may delete the distributed ledger generated by the second block.

FIG. 3 is a drawing for explaining a structure of a database 300 according to one embodiment.

The service system may generate a first block through a first data group and a first hash corresponding to the first data group, and may record the first block in the form of a distributed ledger. In addition, the service system may generate a second block through a second data group including the first data group and a second hash corresponding to the second data group, and may record the second block in the form of a distributed ledger.

The distributed ledger management apparatus according to one embodiment may record the distributed ledger based on the second block in an entire ledger database 310, and may record the distributed ledger based on the first block in one or more partial ledger databases 320.

The distributed ledger management apparatus according to one embodiment may a first block by classifying data classified according to a degree of importance, the purpose of use, or the like into the first data group. In addition, the distributed ledger management apparatus may generate a second block by classifying entire data including the classified data into the second data group. For example, data groups included in transactions may include not only the data that is essential, that is, the data to be maintained for a long time, but also the data that is required only in some entities for intermediate procedures. In this case, when blocks and distributed ledgers are generated using all data included in transactions, the storage space may be wasted, resulting in increase in costs.

Specifically, the service system according to one embodiment may record the generated first block using a first hash and a previous hash in the form of a distributed ledger in at least one of the partial ledger databases 320.

In addition, the service system according to one embodiment may record the generated second block using a second hash and a previous hash in the form of a distributed ledger in the entire ledger database 310.

In the entire ledger database 310 according to one embodiment, the generated distributed ledgers may be recorded using entire data included in data groups included in usage transactions.

In addition, in the partial ledger databases 320 according to one embodiment, distributed ledgers generated using data classified as essential data among data groups included in usage transactions may be recorded.

According to the present disclosure, a model for a novel content distribution management platform to which blockchain technology is applied may be designed, thereby securing technical competitiveness. In addition, reliability may be improved using blockchain technology capable of implementing the integrity of content distribution management.

The database 300 according to one embodiment may be accessed by both the usage history collection system and the service system.

In addition, the distributed ledger management apparatus according to one embodiment may store and manage the recorded distributed ledgers for a predetermined period of time.

The distributed ledger management apparatus according to one embodiment may delete the distributed ledger generated by the second block when predetermined conditions are satisfied. For example, when a set period (for example, 1 month, 6 months, etc.) has elapsed, the service system may determine that predetermined conditions are satisfied, and may delete the distributed ledger generated by the second block.

FIG. 4 is a drawing for explaining a user terminal 400 according to one embodiment.

The user terminal 400 according to one embodiment may generate a usage transaction according to content usage, and may verify a purchase transaction and a usage transaction.

In addition, when necessary, the user terminal 400 may store a block generated according to the transaction, and may compare the block with a block holding another entity, thereby verifying the integrity of the transaction.

For this purpose, the user terminal 400 according to one embodiment may include a transaction verifier 410, a usage transaction generator 420, and a broadcasting processor 430.

First, the transaction verifier 410 according to one embodiment may receive purchase transactions generated in the service system, and may verify the received purchase transactions.

A user may generate an intention to purchase content. For example, the user may request purchase of specific content through the portable terminal of the user. In addition, the user may request purchase of content for controlling the user terminal.

When the purchase request is generated by the user, the service system may check the content purchase request signal and generate a purchase transaction for the content in response to the request.

The purchase transaction may include identification information on the content, identification information on the user, purchase time, content information, usage rights, and the like.

In addition, the service system may broadcast the generated purchase transaction, and the transaction verifier 410 may collect and verify the broadcasted purchase transaction.

Next, the usage transaction generator 420 according to one embodiment may generate a usage transaction by reflecting the current status of usage of the content corresponding to the verified purchase transaction.

For example, the usage transaction generator 420 may generate the usage transaction when use of the content is normally terminated.

The service system may collect and verify the broadcasted usage transaction. In addition, the service system may generate and store a block corresponding to the verified usage transaction.

In addition, when a usage transaction generated when use of the content is normally terminated is received, the service system may analyze the current status of usage of the content using the usage transaction.

The service system according to one embodiment may calculate micro-billing information based on the analyzed current status of usage. In addition, the service system may calculate recommended content information corresponding to a user based on the analyzed current status of usage.

The service system according to one embodiment may broadcast the first and second blocks.

Specifically, the service system may collect the broadcasted usage transactions, may verify the collected usage transactions, and may generate and store blocks corresponding to the verified usage transactions. In this case, the service system may generate a first block through a first data group among the usage transactions and a first hash corresponding to the first data group, and may generate a second block through a second data group including the first data group and a second hash corresponding to the second data group. In addition, the service system may separately record the generated first and second blocks in respective distributed ledgers. In addition, the service system according to one embodiment may broadcast the first and second blocks. At this time, the service system may collect and verify the first and second blocks broadcasted through a block verifier 440 of the user terminal 400.

The block verifier 440 according to one embodiment may be included as a component of the user terminal 400, or may be implemented as a part of the transaction verifier 410.

FIG. 5 is a drawing for explaining a content distribution management method based on blockchain technology according to one embodiment.

According to the content distribution management method based on blockchain technology according to one embodiment, a user terminal may transmit a content purchase request signal to a service system according to the content purchase request of the user (501).

In this embodiment, a content purchase request signal is transmitted from the user terminal to the service system. However, a content purchase request signal may be transmitted from various devices to the service system. In addition, content corresponding to the purchase request signal may be provided from the service system to the user terminal.

According to the content distribution management method based on blockchain technology according to one embodiment, the service system may generate a purchase transaction according to a content purchase request (502), and may broadcast the generated purchase transaction (503).

The broadcasted purchase transaction may be collected in a usage history collection system and a user terminal. Each of the usage history collection system and the user terminal may verify the collected purchase transaction (504 and 505).

In addition, content may be used through the user terminal in response to the generated purchase transaction (506). For example, content provided by the service system may be received through the user terminal in a downloading or streaming manner, and may be controlled to be displayed on the display of the user terminal.

According to the present disclosure, the current status of usage related to content distribution may be checked in detail using blockchain technology. In addition, micro-billing for content distribution may be implemented by applying blockchain technology to content distribution management.

According to the content distribution management method based on blockchain technology according to one embodiment, when use of the content is normally terminated (506), the user terminal may generate a usage transaction corresponding to the content (507) and broadcast the usage transaction (508).

The broadcasted usage transaction may be collected in the usage history collection system and the service system, and each of the usage history collection system and the service system may verify the collected usage transaction (509 and 510).

For example, the user terminal may broadcast the generated usage transaction to a network, and the service system connected to the network and the usage history collection system may collect the broadcasted usage transaction. In addition, the service system and the usage history collection system may verify the collected usage transaction based on blockchain technology to determine whether the collected usage transaction is valid.

Once the usage transaction is verified, the service system may generate a block by reflecting to the usage transaction, and may store the block in the form of a distributed ledger (511).

For example, the service system may generate blocks corresponding to usage transactions collected from the user terminal. In this case, the service system may generate an entire distributed ledger as a block reflecting the entire data included in the usage transactions, and may separately generate a partial distributed ledger as a block reflecting the partial data.

More specifically, the service system may generate a first block through a first data group among usage transactions and a first hash corresponding to the first data group. In addition, the service system may generate a second block through a second data group including the first data group and a second hash corresponding to the second data group.

In addition, the service system may chain the first block to the distributed ledger through the previous hash and the current hash (first hash), and may chain the second block to the distributed ledger through the previous hash and the current hash (second hash). In addition, the service system may independently store and manage the distributed ledgers by first and second blocks.

The service system according to one embodiment may generate a first block by classifying data having a degree of importance higher than a reference value into the first data group. In addition, the service system may generate a second block by classifying entire data including the classified data into the second data group.

In addition, the service system according to one embodiment may generate a separate second block using all data without considering a degree of importance predetermined among data groups included in transactions. The generated second block may be recorded and managed as another distributed ledger using a second hash and a previous hash.

The service system according to one embodiment may delete the distributed ledger generated by the second block when predetermined conditions are satisfied. For example, when a set period has elapsed, the service system may judge that predetermined conditions are satisfied, and may delete the distributed ledger generated by the second block.

That is, the service system according to one embodiment may generate blocks corresponding to only data classified as essential data among data groups included in usage transactions, and may record the blocks in the form of a distributed ledger.

That is, the present disclosure provides blockchain technology for distributing a ledger in which transaction information is recorded to a P2P network rather than a central server so that participants may jointly manage the records. Therefore, the present disclosure may ensure integrity compared to conventional distribution-related or encryption-related technology. That is, the present disclosure may provide improved security, transparency, safety, and efficiency using blockchain technology.

According to the content distribution management method based on blockchain technology according to one embodiment, the service system may broadcast the generated block to another entity for verification (512).

Specifically, the service system may broadcast the block generated by reflecting the usage transaction in the usage history collection system and the user terminal. The usage history collection system for collecting the block and the user terminal may verify the block based on blockchain technology (513 and 514).

In this case, at least one of the usage history collection system and the user terminal may store the verified block.

According to the content distribution management method based on blockchain technology according to one embodiment, in the case of the usage history collection system, the block may be cumulatively recorded in a database in the form of a distributed ledger, and may be held for a period time for verification.

According to the content distribution management method based on blockchain technology according to one embodiment, in the service system, the current status of usage of the content may be analyzed using the usage transaction transmitted from the user terminal.

According to the content distribution management method based on blockchain technology according to one embodiment, in the service system, the current status of usage of the content used by a user may be accumulated, and the accumulated current status of usage may be used for billing.

Therefore, the present disclosure may provide a model for novel content distribution management. In addition, the integrity of content distribution management may be secured by applying blockchain technology to content distribution management, thereby blocking and preventing illegal distribution of content.

In addition, the present disclosure may provide blockchain technology for distributing a ledger in which transaction information is recorded to a P2P network rather than a central server so that participants may jointly manage the records. Therefore, in the conventional method, a trusted third party (TTP) for trusting the database of a central server is required, but the present disclosure may omit such a requirement. In addition, compared to conventional centralized systems, the present disclosure may improve security, transparency, safety, and efficiency using blockchain technology.

According to one embodiment, the present disclosure can provide a model for novel content distribution management.

According to one embodiment, the present disclosure can ensure the integrity of content distribution management by applying blockchain technology to content distribution management.

According to one embodiment, the present disclosure can block and prevent illegal distribution of content by applying blockchain technology to content distribution management.

According to one embodiment, a model for a novel content distribution management platform to which blockchain technology is applied can be designed.

According to one embodiment, technical competitiveness for a novel content distribution management platform can be secured.

According to one embodiment, reliability can be improved using blockchain technology capable of implementing the integrity of content distribution management.

According to one embodiment, the current status of usage related to content distribution can be finely checked by applying blockchain technology to content distribution management.

According to one embodiment, a distributed ledger in content distribution management based on blockchain technology can be efficiently managed.

According to one embodiment, the present disclosure can provide blockchain technology for distributing a ledger in which transaction information is recorded to a P2P network rather than a central server so that participants may jointly manage the records. Therefore, in the conventional method, a trusted third party (TTP) for trusting the database of a central server is required, but the present disclosure can omit such a requirement.

According to one embodiment, compared to conventional centralized systems, the present disclosure can improve security, transparency, safety, and efficiency using blockchain technology.

The apparatus described above may be implemented as a hardware component, a software component, and/or a combination of hardware components and software components. For example, the apparatus and components described in the embodiments may be achieved using one or more general purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may execute an operating system (OS) and one or more software applications executing on the operating system. In addition, the processing device may access, store, manipulate, process, and generate data in response to execution of the software. For ease of understanding, the processing apparatus may be described as being used singly, but those skilled in the art will recognize that the processing apparatus may include a plurality of processing elements and/or a plurality of types of processing elements. For example, the processing apparatus may include a plurality of processors or one processor and one controller. Other processing configurations, such as a parallel processor, are also possible.

The software may include computer programs, code, instructions, or a combination of one or more of the foregoing, configure the processing apparatus to operate as desired, or command the processing apparatus, either independently or collectively. In order to be interpreted by a processing device or to provide instructions or data to a processing device, the software and/or data may be embodied permanently or temporarily in any type of a machine, a component, a physical device, a virtual device, a computer storage medium or device, or a transmission signal wave. The software may be distributed over a networked computer system and stored or executed in a distributed manner. The software and data may be stored in one or more computer-readable recording media.

The methods according to the embodiments of the present disclosure may be implemented in the form of a program command that can be executed through various computer means and recorded in a computer-readable medium. The computer-readable medium can store program commands, data files, data structures or combinations thereof. The program commands recorded in the medium may be specially designed and configured for the present disclosure or be known to those skilled in the field of computer software. Examples of a computer-readable recording medium include magnetic media such as hard disks, floppy disks and magnetic tapes, optical media such as CD-ROMs and DVDs, magneto-optical media such as floptical disks, or hardware devices such as ROMs, RAMs and flash memories, which are specially configured to store and execute program commands. Examples of the program commands include machine language code generated by a compiler and high-level language code executable by a computer using an interpreter and the like. The hardware devices described above may be configured to operate as one or more software modules to perform the operations of the embodiments, and vice versa.

Although the present disclosure has been described with reference to limited embodiments and drawings, it should be understood by those skilled in the art that various changes and modifications may be made therein. For example, the described techniques may be performed in a different order than the described methods, and/or components of the described systems, structures, devices, circuits, etc., may be combined in a manner that is different from the described method, or appropriate results may be achieved even if replaced by other components or equivalents.

Therefore, other embodiments, other examples, and equivalents to the claims are within the scope of the following claims.

What is claimed is:

1. A content distribution management system using blockchain technology, comprising:
   a memory configured to store computer-readable instructions: and
   a processor configured to execute the computer-readable instructions such that when executed, the processor is configured to
   generate a purchase transaction in response to a content purchase request signal from a user terminal,
   broadcast the generated purchase transaction,
   collect usage transactions generated in response to a current status of usage of the content, when content corresponding to a verified purchase transaction is used in the user terminal after the broadcasted purchase transaction is verified,
   verify the collected usage transactions,
   generate blocks corresponding to the verified usage transactions, and in this case, a first block is generated through a first data group among the usage transactions and a first hash corresponding to the first data group, and a second block is generated through a second data group comprising the first data group and a second hash corresponding to the second data group,
   separately record the generated first and second blocks in respective distributed ledgers,
   wherein the processor generates the first block by classifying data classified according to essential data into the first data group, and generates the second block by classifying entire data comprising the classified data into the second data group,
   wherein the processor records the first block to a partial distributed ledger and records the second block to an entire distributed ledger,
   wherein the partial distributed ledger includes first partial distributed ledger based on first essential data according to user IDs and second partial distributed ledger based on second essential data according to the current status of usage of the content,
   wherein the purchase transaction includes information of transaction IDs of purchasing, purchasers, purchase time, content identifiers, and service provider identifiers, and
   wherein the usage transactions include information of transaction IDs of using, users, usage time, content identifiers, and service provider identifiers.

2. The content distribution management system according to claim 1, wherein the generated usage transactions comprise data groups comprised in the verified purchase transaction.

3. The content distribution management system according to claim 1, wherein the processor generates the first block by classifying data having a degree of importance higher than a reference value into the first data group, and generates the second block by classifying the entire data comprising the classified data into the second data group,
   wherein the degree of importance to distinguish between data is predefined according to specifications for each data.

4. The content distribution management system according to claim 1, wherein the processor generates the first block by classifying data classified according to a purpose of use into the first data group, and generates the second block by classifying the entire data comprising the classified data into the second data group.

5. The content distribution management system according to claim 1, wherein the processor separately records the generated first and second blocks in a distributed ledger database capable of being shared by a service system and a usage history collection system.

6. The content distribution management system according to claim 1, wherein the processor records the generated first block in a first database in a form of a distributed ledger, and records the generated second block in a second database in a form of another distributed ledger, wherein the first and second databases are physically separated from each other.

7. The content distribution management system according to claim 1, wherein the processor deletes a distributed ledger generated by the second block when predetermined conditions are satisfied.

8. The content distribution management system according to claim 7, wherein, when a set period has elapsed, the processor judges that the predetermined conditions are satisfied, and deletes the distributed ledger generated by the second block.

9. A content distribution management system using blockchain technology, comprising:
   a memory configured to store computer-readable instructions: and
   a processor configured to execute the computer-readable instructions such that when executed, the processor is configured to
   receive a purchase transaction generated in a service system when content is purchased and verify the received purchase transaction,
   generating usage transactions by reflecting a current status of usage of the content corresponding to the verified purchase transaction;
   broadcast the generated usage transactions,
   wherein the service system collects the broadcasted usage transactions; verifies the collected usage transactions; and generates and stores blocks corresponding to the verified usage transactions, and in this case, the service system generates a first block through a first data group among the usage transactions and a first hash corresponding to the first data group; and generates a second block through a second data group comprising the first data group and a second hash corresponding to the second data group; and separately records the generated first and second blocks in respective distributed ledgers, wherein the service system generates the first block by classifying data classified according to essential data into the first data group, and generates the second block by classifying entire data comprising the classified data into the second data group, wherein the service system generates records the first block to a partial distributed ledger and records the second block to an entire distributed ledger, wherein the partial distributed ledger includes first partial distributed ledger based on first essential data according to user IDs and second partial distributed ledger based on second essential data according to the current status of usage of the content wherein the purchase transaction includes information of transaction IDs of purchasing, purchasers, purchase time, content identifiers, and service provider identifiers, and wherein the usage transactions include information of transaction IDs of using, users, usage time, content identifiers, and service provider identifiers.

10. The content distribution management system according to claim 9, wherein the service system further comprises a block verifier for broadcasting the generated first and second blocks and for collecting and verifying the broadcasted first and second blocks.

11. A content distribution management method using blockchain technology, comprising:

generating a purchase transaction in response to a content purchase request signal from a user terminal;

broadcasting the generated purchase transaction;

collecting usage transactions generated in response to a current status of usage of the content when content corresponding to a verified purchase transaction is used in the user terminal after the broadcasted purchase transaction is verified;

verifying the collected usage transactions;

generating a first block through a first data group among the usage transactions and a first hash corresponding to the first data group when blocks corresponding to the verified usage transactions are generated;

generating a second block through a second data group comprising the first data group and a second hash corresponding to the second data group;

separately recording and managing the generated first and second blocks in respective distributed ledgers, wherein the generating the first block comprises generating the first block by classifying data classified according to essential data into the first data group, wherein the generating the second block comprises generating the second block by classifying entire data comprising the classified data into the second data group, wherein the separately recording and managing the generated first and second blocks comprises recording the first block to a partial distributed ledger and recording the second block to an entire distributed ledger, and wherein the partial distributed ledger includes first partial distributed ledger based on first essential data according to user IDs and second partial distributed ledger based on second essential data according to the current status of usage of the content, wherein the purchase transaction includes information of transaction IDs of purchasing, purchasers, purchase time, content identifiers, and service provider identifiers, and wherein the usage transactions include information of transaction IDs of using, users, usage time, content identifiers, and service provider identifiers.

12. The content distribution management method according to claim 11, wherein the generating the first block comprises generating the first block by classifying data having a degree of importance higher than a reference value into the first data group, and the generating the second block comprises generating the second block by classifying the entire data comprising the classified data into the second data group, wherein the degree of importance to distinguish between data is predefined according to specifications for each data.

13. The content distribution management method according to claim 11, wherein the generating the first block comprises generating the first block by classifying data classified according to a purpose of use into the first data group, and the generating the second block comprises generating the second block by classifying the entire data comprising the classified data into the second data group.

14. The content distribution management method according to claim 11, wherein the separately recording and managing the generated first and second blocks comprises separately recording the generated first and second blocks in a distributed ledger database capable of being shared by a service system and a usage history collection system.

15. The content distribution management method according to claim 11, wherein the separately recording and managing the generated first and second blocks comprises determining whether predetermined conditions are satisfied; and deleting a distributed ledger generated by the second block when the predetermined conditions are satisfied.

* * * * *